(12) United States Patent
Han et al.

(10) Patent No.: US 10,509,748 B2
(45) Date of Patent: Dec. 17, 2019

(54) MEMORY SHARING FOR APPLICATION OFFLOAD FROM HOST PROCESSOR TO INTEGRATED SENSOR HUB

(71) Applicant: INTEL CORPORATION, Santa Clara, CA (US)

(72) Inventors: Ke Han, Shanghai (CN); Dong Wang, Shanghai (CN); Qin Duan, Shanghai (CN); Xiaodong Cai, Shanghai (CN); Lu Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/577,658

(22) PCT Filed: Dec. 30, 2016

(86) PCT No.: PCT/CN2016/113473
§ 371 (c)(1),
(2) Date: Nov. 28, 2017

(87) PCT Pub. No.: WO2018/120010
PCT Pub. Date: Jul. 5, 2018

(65) Prior Publication Data
US 2018/0357190 A1 Dec. 13, 2018

(51) Int. Cl.
*G06F 13/28* (2006.01)
*G01C 22/00* (2006.01)
(Continued)

(52) U.S. Cl.
CPC ............. *G06F 13/28* (2013.01); *G01C 22/00* (2013.01); *G01S 17/023* (2013.01); *G09B 29/106* (2013.01); *G06F 2213/28* (2013.01)

(58) Field of Classification Search
CPC ....... G06F 5/14; G06F 12/084; G06F 12/0842
See application file for complete search history.

(56) References Cited

U.S. PATENT DOCUMENTS

| 7,484,065 B2 * | 1/2009 | Pomaranski ............ G06F 12/06 707/999.202 |
| 2004/0034469 A1 | 2/2004 | Kim |

(Continued)

OTHER PUBLICATIONS

"Move_base—ROS Wiki.pdf", retrieved from the Internet: http://wiki.ros.org/move_base, 7 pages.
(Continued)

*Primary Examiner* — Getente A Yimer
(74) *Attorney, Agent, or Firm* — Finch & Maloney PLLC

(57) ABSTRACT

Memory sharing techniques are provided for offloading an application from a host processor to an integrated sensor hub (ISH). A methodology implementing the techniques according to an embodiment includes allocating a shared region of memory to be accessed by the host processor and by the ISH, in connection with the execution of a location application. The method also includes storing a location database in the shared region of memory. The location database is divided into segments, where each segment is associated with an area, for example, defined by a range of latitudes and longitudes. The method further includes transferring, through a direct memory access (DMA), one or more of the segments between the shared memory region and a second memory associated with the ISH. The method further includes executing at least a portion of the location application on the ISH, based on the data segments stored in the second memory.

25 Claims, 8 Drawing Sheets

(51) Int. Cl.
    *G01S 17/02*    (2006.01)
    *G09B 29/10*    (2006.01)

(56) References Cited

U.S. PATENT DOCUMENTS

| | | |
|---|---|---|
| 2012/0323431 A1 | 12/2012 | Wong et al. |
| 2014/0208041 A1* | 7/2014 | Hyde ................. G06F 12/0831 |
| | | 711/146 |
| 2014/0223098 A1* | 8/2014 | Lee ...................... G06F 9/5016 |
| | | 711/118 |
| 2014/0281341 A1* | 9/2014 | Bhat ......................... G06F 5/10 |
| | | 711/171 |
| 2015/0227554 A1 | 8/2015 | Oi et al. |
| 2016/0095060 A1 | 3/2016 | Seddighrad et al. |
| 2016/0154735 A1* | 6/2016 | Hwang ................ G06F 12/084 |
| | | 711/130 |

OTHER PUBLICATIONS

International Search Report for International Patent Application No. PCT/CN2016/113473, 4 pages.
International Written Opinion for International Patent Application No. PCT/CN2016/113473, 4 pages.
International Preliminary Report on Patentability and Written Opinion of the International Searching Authority dated Jul. 11, 2019 for International Patent Application No. PCT/CN2016/113473, 5 pages.

* cited by examiner

MEMORY SHARING FOR APPLICATION OFFLOAD FROM HOST PROCESSOR TO INTEGRATED SENSOR HUB

BACKGROUND

A sensor hub is a system, for example a processor or microcontroller, which is configured to integrate data from multiple sensors, and process that data for an application of interest. The processed sensor data may then be provided to a host processor for further processing or end use. On platforms where the sensor hub is integrated with the host processor, for example as a system on a chip, the sensor hub may be referred to as an integrated sensor hub (ISH). Some applications, however, have relatively large memory requirements that often exceed the memory capacity of the ISH. Example of such applications may include image processing, audio processing, and location navigation applications. In such cases, the host processor is typically required to take on the additional computational burden of such application processing.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
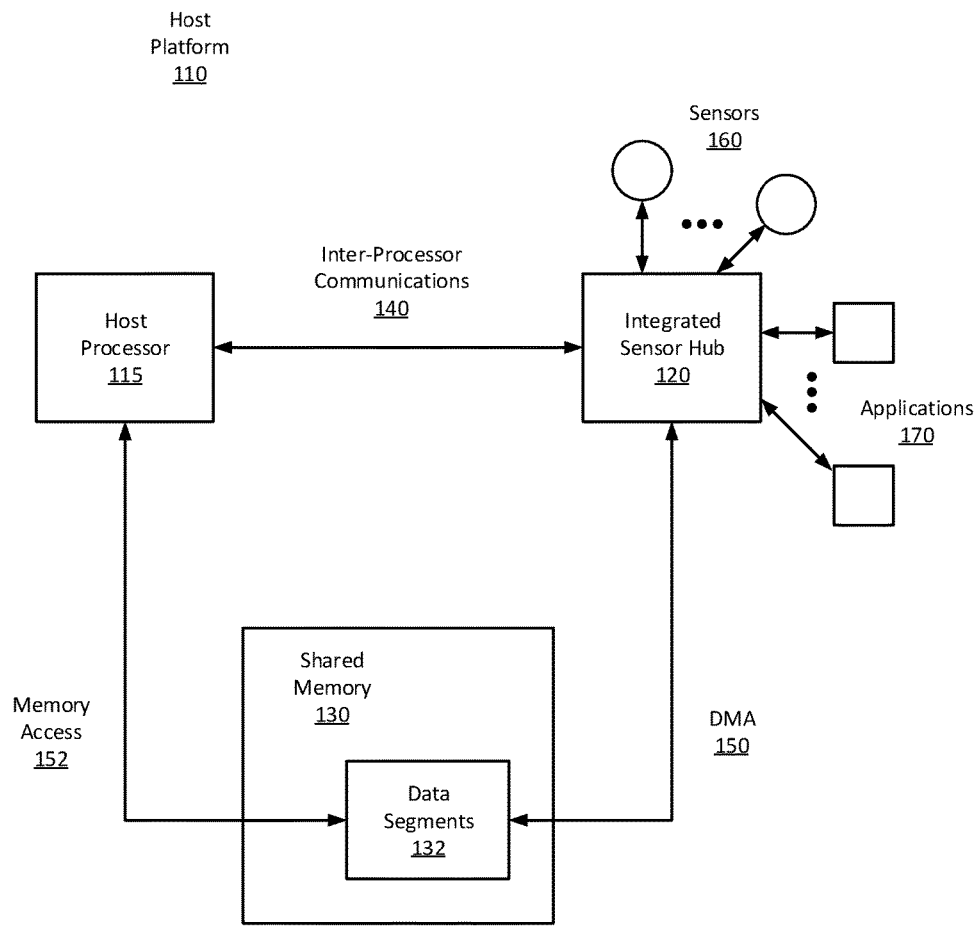
FIG. 1 is a top level diagram of an implementation of memory sharing between a host and an integrated sensor hub (ISH), configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for memory sharing to facilitate offloading of an application, or portions thereof, from a platform host processor to an integrated sensor hub (ISH). In some embodiments, the application is a location, mapping, and/or navigation application, although other types of memory-intensive applications may benefit from these techniques, as will be appreciated in light of this disclosure. Such applications generally require access to relatively large databases which generally exceed the memory capacity of the ISH. The disclosed techniques address this problem by dynamically transferring segments of the database between the host memory and the ISH memory, as required based on updated conditions. For example, in a location application, as the current location of interest changes, different segments of a map database can be transferred back and forth between the host processor and the ISH.

The disclosed techniques will be described in the context of an integrated sensor hub (ISH), but it will be appreciated that these techniques may similarly be applied to other embodiments including, for example, a discrete sensor hub or an embedded controller.

In accordance with an embodiment, the disclosed techniques can be implemented, for example, in a computing system or platform, or a software product executable or otherwise controllable by such systems. The system or product is configured to allocate a shared region of memory. In some embodiments, the techniques are implemented in a host platform that includes a host processor, an ISH, and a memory. The memory is associated with the host processor and the shared region is accessible by both the host processor and by the ISH, in connection with the execution of a given memory-intensive application, such as a location application or navigation application. The system is also configured to store a location database, for example a map, in the shared region. The location database is divided into a number of segments, each segment associated with a location area (geographic location). In some embodiments, the segments (and associated location areas) are defined by a range of latitude and longitude values. The system is further configured to transfer one or more of the segments between the shared region and a second memory onboard or otherwise associated with the ISH. The transfer may be performed, for example, as a direct memory access (DMA) transfer under control of the ISH, and may be based on a current geographic location of the system relative to the location areas associated with the segments. The system is further configured to execute at least a portion of the location application on the ISH based on the data stored in the segments that have been transferred to the ISH memory, as well as data collected from sensors of the ISH.

The techniques described herein may allow for improved computational efficiency, by offloading processing of applications to the ISH, that use sensor data from the ISH, compared to existing methods that require the host processor to perform those computations. The disclosed techniques can be implemented on a broad range of computing and communication platforms, including mobile devices, since the techniques are more computationally efficient than existing methods. These techniques may further be implemented in hardware or software or a combination thereof.

FIG. 1 is a top level diagram 100 of an implementation of memory sharing between a host processor and an integrated sensor hub (ISH), configured in accordance with certain embodiments of the present disclosure. A host platform 110 is shown to include a host processor 115 communicatively coupled to an ISH 120 through an inter-processor communication path 140. The ISH 20 is configured to collect data from any number of deployed sensors 160. The ISH 120 is further configured to execute, at least in part, any number of applications 170 which may operate on the collected sensor data. A shared memory 130 is also shown, which may be accessed by the host processor 115, using memory access techniques 152, and by the ISH 120 using DMA transfers 150. The shared memory is configured to store data set meats 132, as will be described in greater detail below, which provided portions of a database to the ISH for use in the execution of the applications 170.

Figure 2:
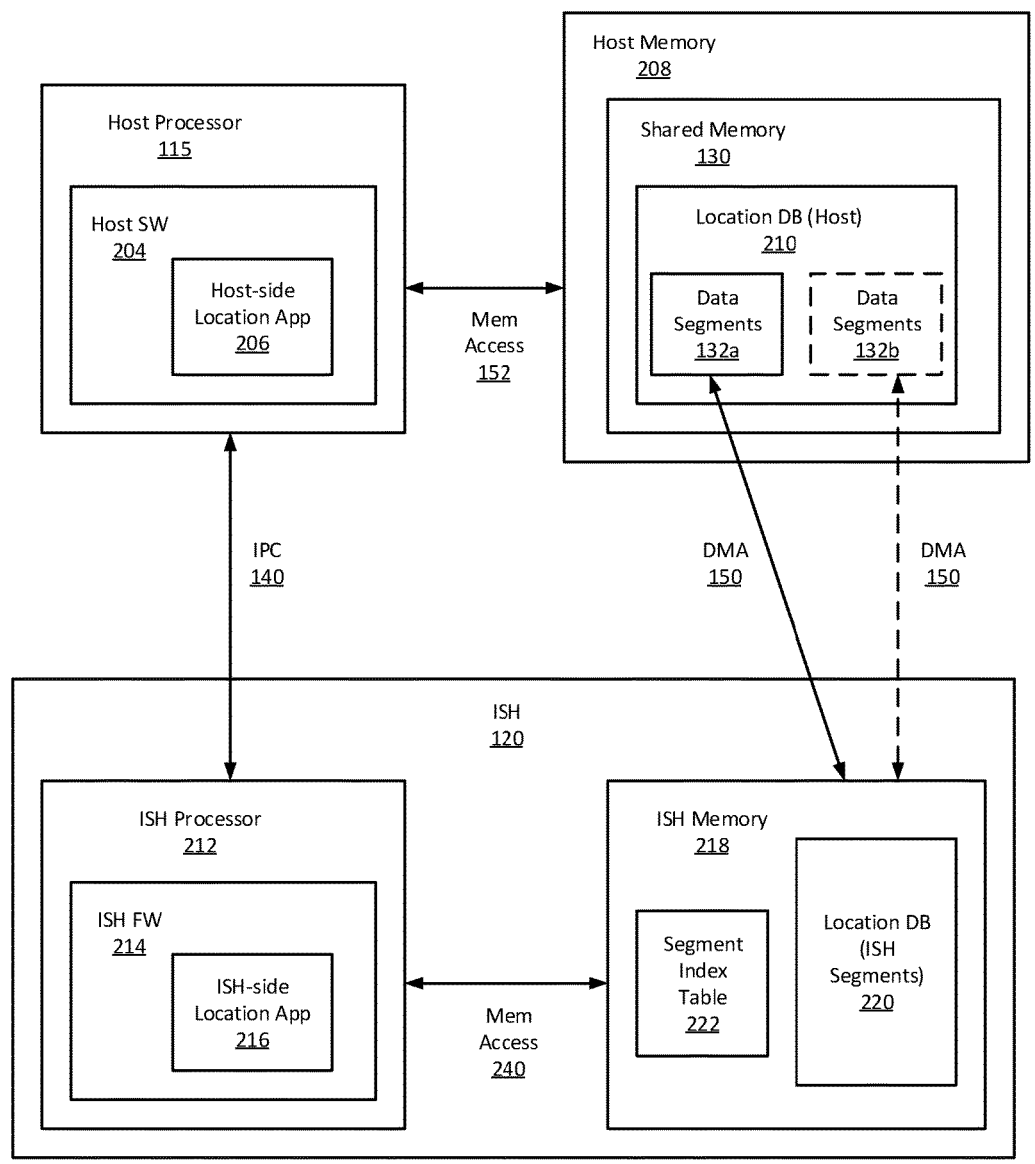
FIG. 2 is a more detailed block diagram of the host and the ISH, configured in accordance with certain embodiments of the present disclosure.

FIG. 2 is a more detailed block diagram 200 of the host resources and the ISH, configured in accordance with certain embodiments of the present disclosure. The host platform 110 is shown to include the host processor 115 and host memory 208, which provides shared memory 130. The host processor 115 is shown to be configured to execute host software (SW) 204, which in some embodiments may include an operating system, kernel, drivers, and any number of applications. A host side location application 206 is shown as one of the applications. The term "host-side" is used to refer to a portion of the location application that is executed on the host. In some embodiments, the location application may include navigation and/or mapping applications.

Host memory 208 is configured to store data for use by the host processor applications including a host-side location database (DB) 210 for the location application. The host processor 115 is configured to access the host memory 208 using known memory access techniques 152, in light of the present disclosure. In some embodiments, the location database may include one or more of an indoor or outdoor map for navigation, a GPS (Global Positioning System) satellite calendar for GPS positioning, a cellular phone network database for cellular positioning, a WiFi (Wireless Fidelity) database for WiFi fingerprint positioning or trilateration positioning, and an iBeacon database of iBeacon positioning. In some embodiments, the host-side location database 210 can range in size from 1 Mbyte to 100 Mbytes or more in order to store a relatively complete or full-size version of the database. As further shown, the host-side location database 210 is segmented into data segments 132a, 132b, etc., as will be explained in greater detail below. In some embodiments, the segments are associated with a location area, for example a range of latitude and longitude locations on a map. At least some regions of host memory 208 are configured to be shareable with the ISH, for example through DMA transfers 150. In some embodiments, other known and suitable memory access techniques, in light of the present disclosure, may be used to share regions of host memory with the ISH. Such shareable region may include one or more of the data segments 132. In some embodiments, the host memory 208, or the portion of host memory allocated for sharing, may comprise double data rate (DDR) memory.

In some embodiments, the storage of the location database may performed by the host processor 115, for example as an initialization operation. After that initialization, the shared memory 130 may be set to a read-only mode for the host processor and to read-write mode by the ISH processor, to avoid memory access conflicts. In some embodiments, other known memory access conflict avoidance techniques, in light of the present disclosure, may be employed.

The 120 is shown to include an ISH processor 212 and ISH memory 218. The ISH memory 218 is typically smaller (e.g., providing less storage capacity) than the host memory 208. In some embodiments, the ISH memory 208 may comprise static ram (SRAM). The ISH processor 212 is shown to be configured to execute ISH firmware (FW) 214, which in some embodiments may include a real-time operating system, kernel, drivers, and any number of other applications/functions including an ISH-side application 216. The term "ISH-side" is used to refer to a portion of the location application that is executed on the ISH.

ISH memory 218 is configured to store segments of the location database that are shared with the host data, shown as ISH-side location DB segments 220 in FIG. 2. These segments are provided for use by the ISH-side location application processing. A segment index table 222 is also shown and is configured to track and identify the segments that are being shared or that need to be shared. The segment index table may be used in conjunction with the DMA transfers 150 to enable the ISH processor to initiate and manage DMA transfers without requiring the host processor to "wake-up" or otherwise devote resources to the transfer. The ISH processor 212 is configured to access the memory 216 using known memory access techniques 240, in light of the present disclosure.

An inter-process communication (IPC) path 140 is also shown and is configured to provide communications between the host processor 115 and ISH processor 212 to coordinate and manage the DMA transfers as well as the execution of the respective portions of the location applications on each side (e.g., host processor and ISH). The IPC 140 may be configured to use known data communication techniques, in light of the present disclosure. In some embodiments, the host-side portion of the location application may include processing that involves a relatively large portion of the location database, such as, for example, full map processing or global route planning. In contrast, the ISH-side portion of the location application may include relatively localized processing that reties on smaller sections of the location database.

Figure 3A:
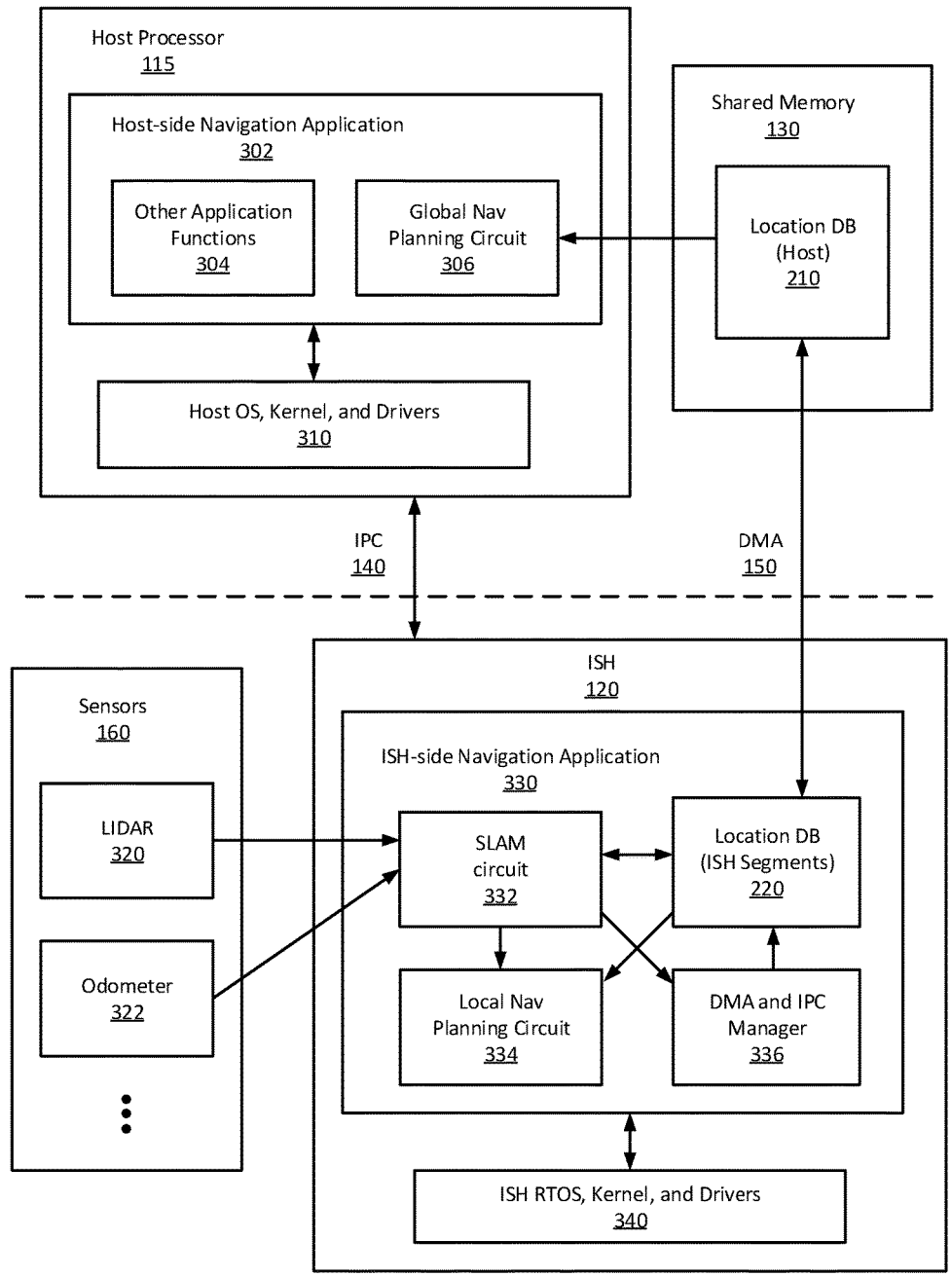
FIG. 3A is another more detailed block diagram of the host and the ISH for an example application, configured in accordance with certain embodiments of the present disclosure.

FIG. 3A is another more detailed block diagram of the host resources and the ISH, configured in accordance with certain embodiments of the present disclosure, in the context of a navigation application. The navigation application is presented as one illustrative example of application offloading from a host processor to an ISH based on memory sharing; other memory-intensive software applications that can benefit from the techniques provided herein will be apparent. The navigation application, as shown, is divided into a host-side navigation application 302 and an ISH-side navigation application 330. In some embodiments, the host-side navigation application 302 may comprise any numbers of functional modules 304 including, for example, a global navigation planning circuit 306 configured to determine a global route from a first point to a potentially distant second point, based on map data stored in the host-side location database 210.

The ISH-side navigation application 330 is shown to include a local navigation planning circuit 333 configured to perform local route planning based on the data segments stored in the ISH-side location database 220. Local route planning may include, for example, obstacle avoidance for robotic travel.

The ISH is also shown to include sensors, such as, for example, an odometer 322 and a Light Detection and Ranging (LIDAR) sensor 320. It will be appreciated that any number of other sensors (not shown) may also be included as appropriate for different applications.

The ISH-side navigation application 330 is also shown to include a Simultaneous Localization and Mapping (SLAM) circuit 332 configured to construct or update a map while tracking a current location, for example in a robotic application. The SLAM circuit 332 may operate based on sensor data provided by the LIDAR 320, odometer 322, and/or any other available sensors, in addition to map data provided by the data segments stored in the ISH-side location database 220, using known techniques in light of the present disclosure. In some embodiments, the SLAM circuit 332 may be configured to update potions of the map in the shared segments 220, which may then be transferred back to the full location database 210 on the host-side.

The ISH-side navigation application 330 is also shown to include a DMA and IPC management circuit 336 configured to coordinate DMA and IPC operations between the ISH and host processor, as described in greater detail below in connection with FIGS. 4 and 5. In some embodiments, IPC communications may also include transmission of the segment index table 222 and transmission of application results, such as the planned route.

The host side is also shown to include a host OS, kernel, and drivers 310, while the ISH side is shown to include a real-time operating system (RTOS), kernel and drivers 340, configured to provide OS support functions and driver level communications and controls using known known techniques in light of the present disclosure.

Figure 3B:
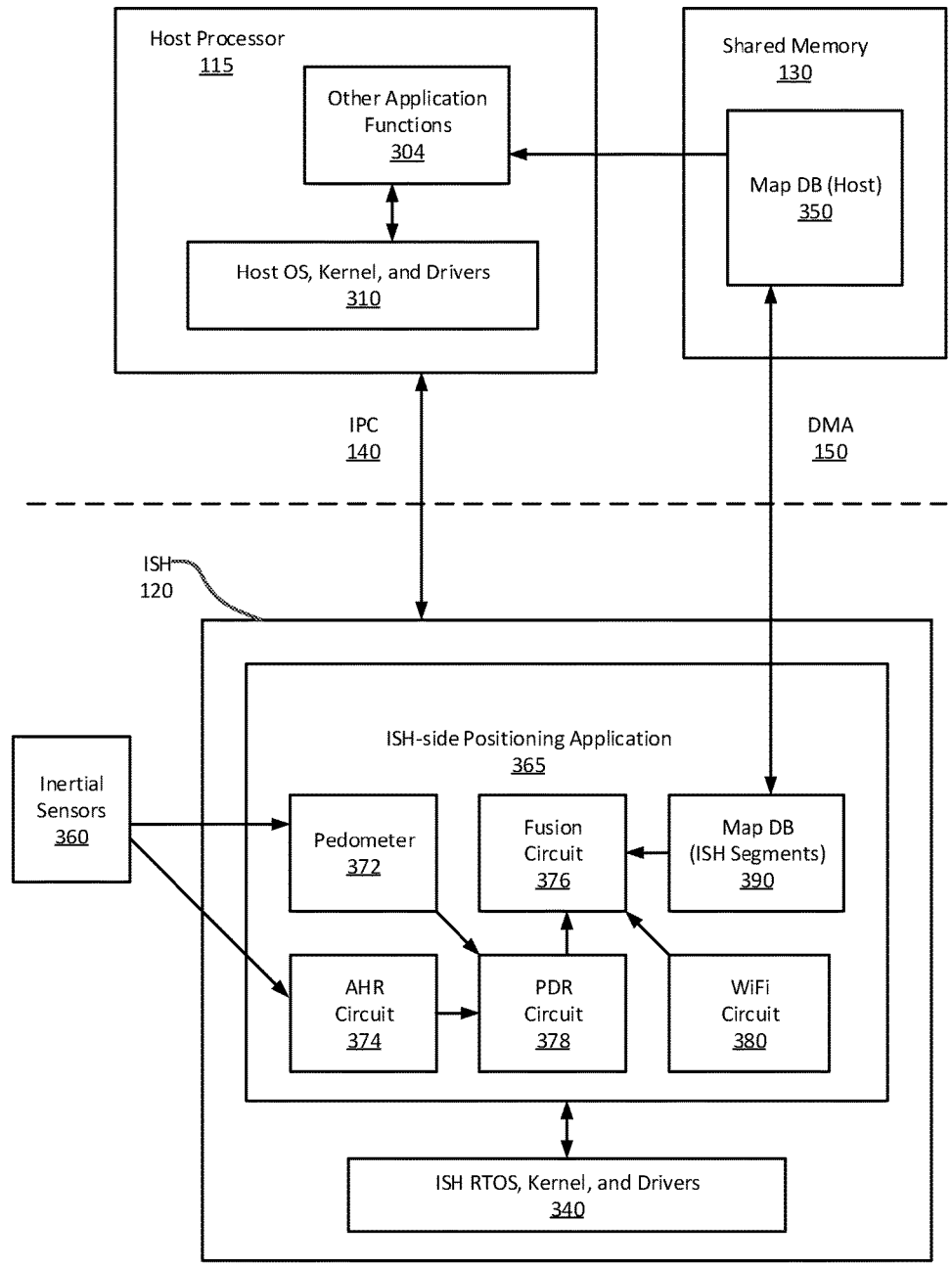
FIG. 3B is another more detailed block diagram of the host and the ISH for another example application, configured in accordance with certain embodiments of the present disclosure.

It will be appreciated that other types of implications within the scope of the disclosed techniques are also envisioned. For example in some embodiments, an indoor positioning application may be configured to fuse sensor data (e.g., from an odometer, for pedestrian dead reckoning), WiFi data, and map data from the segments of a map database. Such an embodiment is illustrated in FIG. 3B, which shows a positioning application 365 that has been offloaded to the ISH-side for execution. The positioning application 365 employs fusion of inertial sensor data with WiFi data and map data to provide relatively high accuracy location information in an indoor environment (or in an outdoor forest environment or urban area where a GPS signal is not readily available). The inertial sensors 360 may include an accelerometer, gyroscope, and/or magnetometer. The raw data from the inertial sensors is provided to a pedometer 372, configured to generate step events, and to an attitude heading reference (AHR) circuit 374, configured to generate a heading or orientation. The pedestrian dead reckoning (PDR) circuit 378 is configured to calculate an estimated path along which the user has traveled, based on the step events and heading. The estimated path will drift over time, however, so the fusion circuit 376 is configured to incorporate WiFi based location estimates from Win circuit 380 with map data from the Map DB segments 390. In some embodiments, the WiFi location estimates may be calculated using WiFi trilateration, or other known techniques in light of the present disclosure. Because the full map database 350 (on the host side) can be relatively large, the disclosed memory sharing techniques enable the relevant segments of the map database to be shared to the ISH as needed. In this particular application, where the map data is provided as a reference source which should not generally be altered, the portion of shared memory 130 that stores the map can be set to a read-only mode for both the host processor and the ISH.

Figure 4:
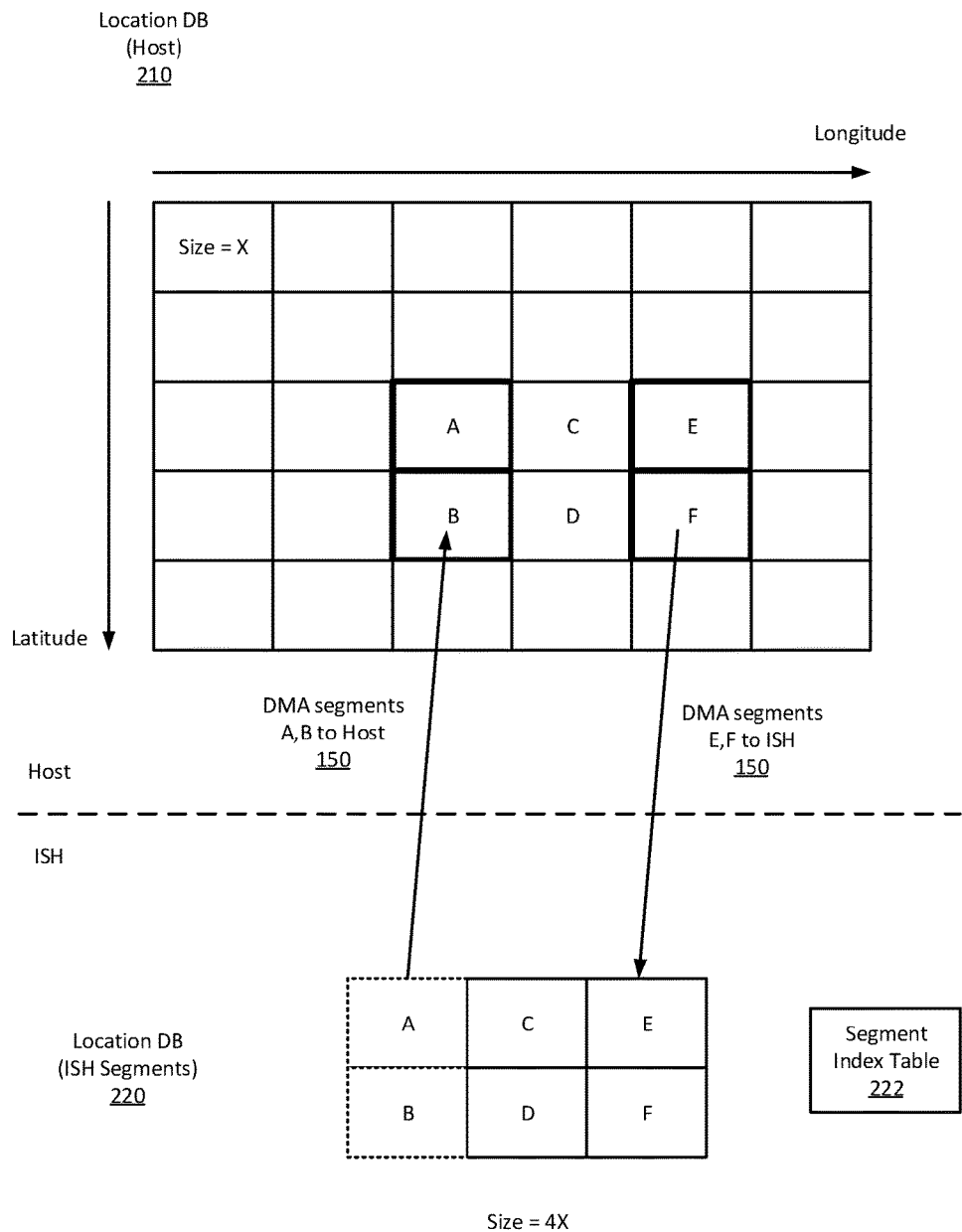
FIG. 4 illustrates memory sharing of data segments of a location database, between the host and the ISH, in accordance with certain embodiments of the present disclosure.

FIG. 4 illustrates memory sharing of data segments of a location database, between the host processor and the ISH, in accordance with certain embodiments of the present disclosure. The host-side location database 210 is shown to be divided into a number of segments, for example each segment of site X bytes. The segments in this example are organized by latitude and longitude, wherein each segment is associated with a location area (e.g., a map region) that is defined by a range of latitude and longitude values. It will be appreciated that other types of applications may arrange the segments according to other suitable criteria or index values.

The ISH memory 218, in this example is shown to have capacity to store 4 segments at any given time (e.g., 4× bytes). At some point during the execution of the ISH portion of the location application portion, the segments labeled A, B, C, and D are shared between the host processor and the ISH. As the location of interest (e.g., the current location of the platform) changes, the shared segments may be switched or swapped so that new segments are made available to the ISH to provide updated location data. For example segments A and B may be swapped out through DMA transfer 150 while segments F and F are similarly swapped in to the ISH memory. In some embodiments, segment index table 222 is updated to reflect information about the source, destination, and size of the DMA transfers and/or the identification of segments currently being shared.

Figure 5:
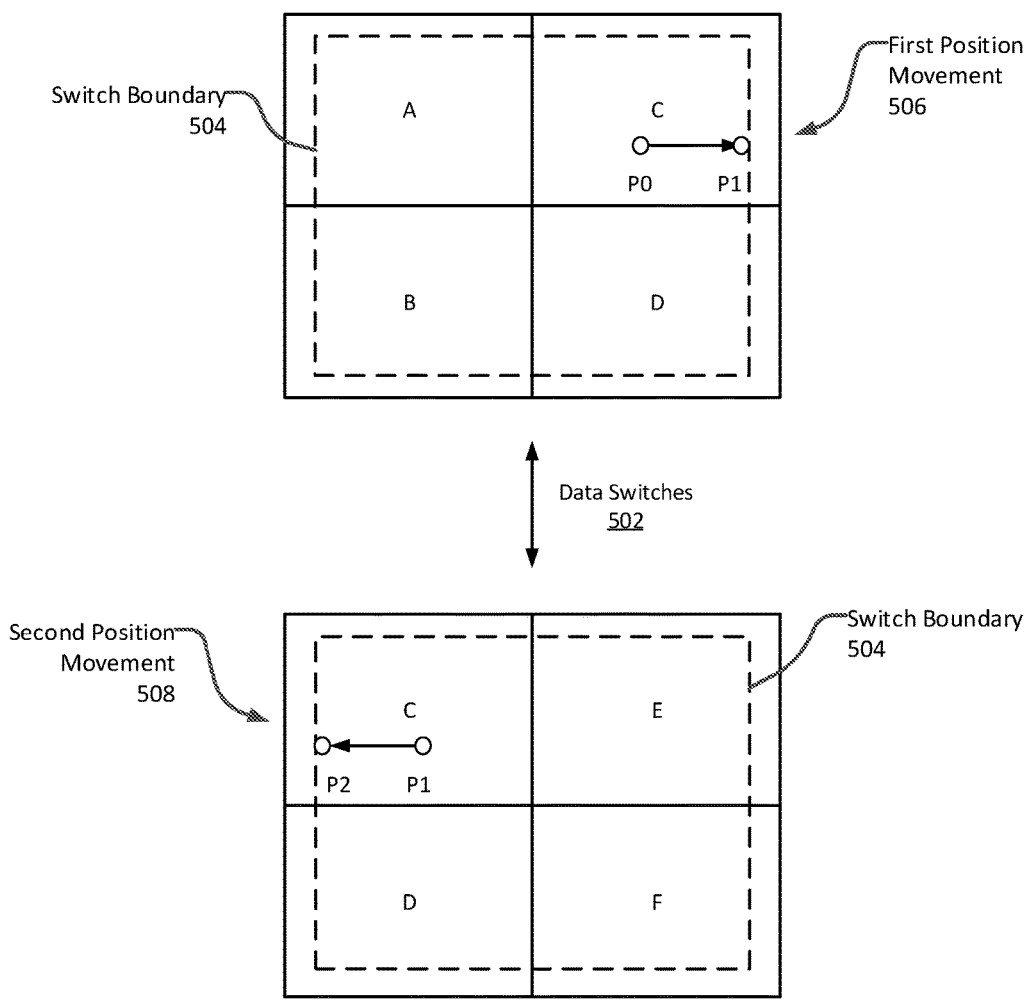
FIG. 5 illustrates memory segment switch boundaries in the location database, in accordance with certain embodiments of the present disclosure.

FIG. 5 illustrates memory segment switch boundaries in the location database, in accordance with certain embodiments of the present disclosure. Data segment switching may be triggered proximity to switch boundaries 504 associated with each segment. For example, as illustrated in the top half of the figure, data segments A, B, C, and D are currently being shared by the ISH, and the location of interest moves from position P0 to position P1 506, which is in proximity to the switch boundary 504. This triggers a data switch 502. As a result, segments A and B, which are less likely to be needed, are swapped out of the ISH memory, and segments E and F, which are more likely to be needed, are swapped in to the ISH memory.

Similarly, as illustrated in the bottom half of the figure, as the location of interest moves from position P1 to position P2 508, a second data switch 502 is triggered. As a result, segments E and F are swapped back out of ISH memory in exchange for segments A and B which are swapped back into ISH memory.

Methodology

Figure 6:
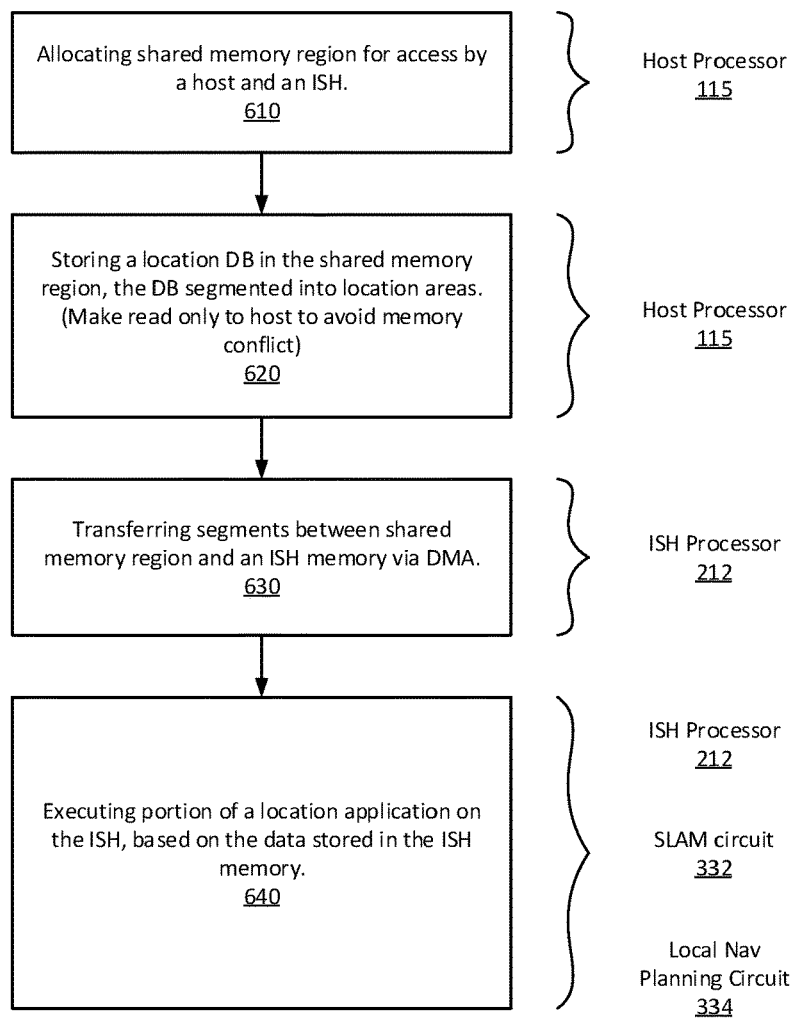
FIG. 6 is a flowchart illustrating a methodology for memory sharing between a host and an ISH, in accordance with certain embodiments of the present disclosure.

FIG. 6 is a flowchart illustrating an example method 600 for memory sharing to facilitate offloading of portions of a software application from a host processor to an integrated sensor hub, in accordance with certain embodiments of the present disclosure. As can be seen, example method 600 includes a number of phases and sub-processes, the sequence of which may vary from one embodiment to another. However, when considered in the aggregate these phases and sub-processes form a process for memory sharing in accordance with certain of the embodiments disclosed herein. These embodiments can be implemented, for example using the system architecture illustrated in FIGS. 1-3 as described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for memory sharing commences by allocating, at operation 610, a shared region of memory to be accessed by the host processor and by the integrated sensor hub (ISH), in connection with the execution of a location application. Next, at operation 620, a location database is stored in the shared region of memory. The location database is to be employed by the location application and is divided into a number of segments. Each segment is associated with a location area which, in some embodiments, may be defined by a range of latitudes and longitudes. In some embodiments, the storage of the location database may performed by the host processor 115, for example as an initialization operation. After that initialization, the shared memory may be set to read-only for the host processor and to read-write by the ISH processor, to avoid memory access conflicts. In some embodiments, other known memory access conflict avoidance techniques, in light of the present disclosure, may be employed.

At operation 630, one or more of the segments is transferred between the shared region of memory and second memory that is associated with the ISH. The transfer is a direct memory access (DMA) transfer. In some embodiments, the DMA transfer may be managed by the in response to determining that a current location is at a location boundary associated with the segments stored in the ISH memory.

At operation 640, at least a portion of the location application is executed on the ISH, using the data that was transferred and stored into the ISH memory. In some embodiments, the location application may include execution of a Simultaneous Localization and Mapping (SLAM) algorithm. Additional inter-process communication may be performed, between the host processor and the ISH, to coordinate the execution of the location application and the DMA transfers.

In some embodiments, the allocating of the shared region of memory and the storing of the location database is performed by a processor associated with the host platform. In some embodiments, the transferring of the segments and the executing of the portion of the location application is performed by a processor associated with the ISH.

Of course, in some embodiments, additional operations may be performed, as previously described in connection with the system. For example, the ISH may receive data from a Light Detection and Ranging (LIDAR) sensor and an odometer sensor for use in executing the location application.

Example System

Figure 7:
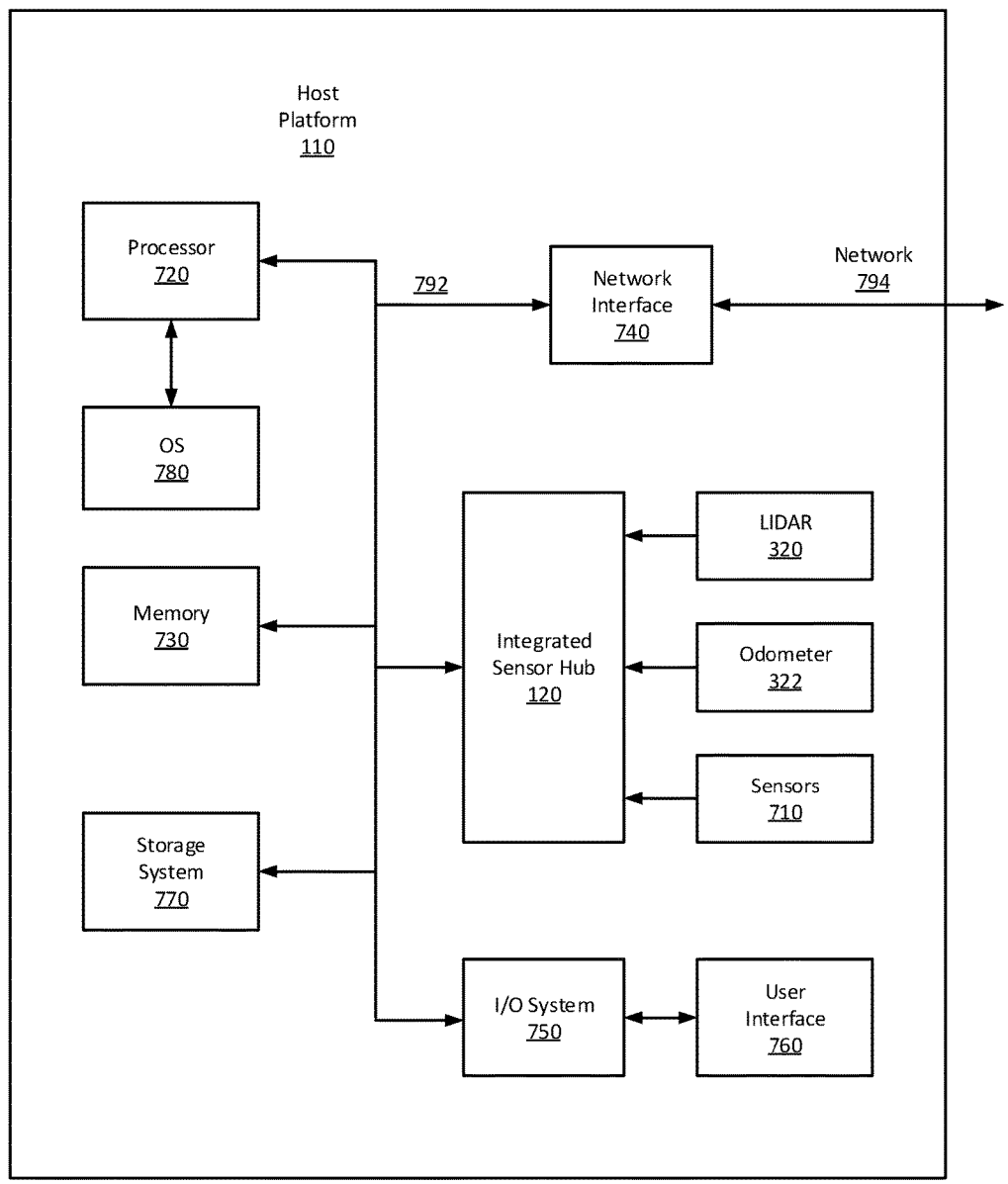
FIG. 7 is a block diagram schematically illustrating a system to perform memory sharing between the host platform and an ISH, configured in accordance with certain embodiments of the present disclosure.

FIG. 7 is a block diagram schematically illustrating a system 700 to perform memory sharing between a platform host processor and an integrated sensor hub (ISH), configured in accordance with certain embodiments of the present disclosure. In some embodiments, system 700 comprises a platform 110 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet or smart sensor device), mobile internet device (MID), messaging device, data communication device, a television (TV), a smart TV, a TV receiver/converter or set top box, and so forth. Any combination of different devices may be used in certain embodiments.

In some embodiments, platform 110 may comprise any combination of a processor 720, a memory 730, ISH 120, a network interface 740, an input/output (I/O) system 750, a user interface 760, a storage system 770, LIDAR 320, odometer 322, and other sensors 710. As can be further seen, a bus and/or interconnect 792 is also provided to allow for communication between the various components listed above and/or other components not shown. Platform 110 can be coupled to a network 794 through network interface 740 to allow for communications with other computing devices, platforms or resources. Other componentry and functionality not reflected in the block diagram of FIG. 7 will be apparent in light of this disclosure, and it will be appreciated that other embodiments are not limited to any particular hardware configuration.

Processor 720 (e.g., host processor 115) can be any suitable processor, and may include one or more coprocessors or controllers, such as an audio processor or a graphics processing unit, to assist in control and processing operations associated with system 700. In some embodiments, the processor 720 may be implemented as an number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or it reduced instruction set computer (RISC) processor. In some embodiments, processor 720 may be configured as an x86 instruction set compatible processor. In some embodiments, processor 720 may be considered to be the host processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), double data rate (DDR) RAM, or static RAM (SRAM) device. Storage system 770 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android Google Mountain View, Calif.), Microsoft Windows (Microsoft Corp., Redmond, Wash.), Apple OS X (Apple Inc., Cupertino, Calif.), or Linux. As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other system 700 of computer system 700 and/or network 794, thereby enabling system 700 to communicate with other local and/or remote computing systems, servers, cloud-based servers and/or resources. Wired communication may conform to existing (or yet to be developed) standards, such as, for example, Ethernet. Wireless communication may conform to existing (or yet to be developed) standards, such as, for example, cellular communications including LTE (Long Term Evolution), timeless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to, user interface 760, and other devices not shown such as a display element, keyboard, mouse, camera, microphone, and speaker, etc.

I/O system 750 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interlace may be any of a high definition multimedia interlace (HDMI), DisplayPort, wireless HDMI, and/or any other suitable interface using wireless high definition compliant techniques. In some embodiments, the graphics subsystem could be integrated into processor 720 or any chipset of platform 110.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Integrated sensor hub (ISH) 120 is configured to collect sensor input data and execute at least a portion of a location application using the sensor input data and segments of a location database that are shared with the host platform 110 (e.g., processor 720 or host processor 115). These memory sharing techniques include DMA transfers, of the segments, between the host and the ISH. The DMA transfers may be managed by the ISH and are based on the proximity of the location to a boundary associated with the segments in the ISH memory. These techniques, for offloading a portion of the application to the ISH through memory sharing, may include any or all of the components illustrated in FIGS. 1-3, as described above. Memory sharing can be implemented or otherwise used in conjunction with a variety of suitable software and/or hardware that is coupled to or that otherwise forms a part of host platform 110.

In various embodiments, host platform 110 may operate with user I/O devices that are capable of providing information to, and receiving information and commands from, a user. These I/O devices may include devices collectively referred to as user interface 760. In some embodiments, user interface 760 may include a textual input device such as a keyboard, and a pointer-based input device such as a mouse. Other input/output devices that may be used in other embodiments include a touchscreen, a touchpad a microphone, and/or a speaker. Still other input/output devices can be used in other embodiments.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits ASICs, programmable logic devices, digital signal processors, FPGAs, logic gates, registers, semiconductor devices, chips, microchips, chipsets, and so forth. Examples of software may include software components, programs, applications, computer programs, application programs, system programs machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more memory sharing methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments, the functionalities disclosed herein can be incorporated into other applications, such as robotics, virtual reality applications, gaming applications, entertainment applications, and/or other video processing applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for memory sharing. The method comprises: allocating, by a host processor, a shared region of a first memory, the shared region to be accessed by the host processor and by an integrated sensor hub (ISH), in connection with the execution of a location application; storing, by the host processor, a location database in the shared region, wherein the location database is divided into a plurality of segments, each segment associated with a location area; transferring one of the plurality of segments between the shared region and a second memory associated with the ISH, wherein the transferring is a direct memory access (DMA) transfer; and executing a portion of the location application on the ISH based on data stored in the second memory.

Example 2 includes the subject matter of Example 1, wherein the transferring of one of the segments and the executing of the portion of the location application are performed by a second processor associated with the ISH.

Example 3 includes the subject matter of Examples 1 or 2, wherein each of the segments of the location database is associated with a location area defined by a range of latitude values and a range of longitude values.

Example 4 includes the subject matter of any of Examples further comprising receiving, by the ISH, data from at least one of a Light Detection and Ranging (LIDAR) sensor and an odometer sensor, the data used for the execution of the location application.

Example 5 includes the subject matter of any of Examples 1-4, wherein the execution of the location application further comprises execution of a Simultaneous Localization and Mapping (SLAM) algorithm.

Example 6 includes the subject matter of any of Examples 1-5, wherein the DMA transfer is managed by the ISH in response to determining that a current location is at a location boundary associated with the segments stored in the second memory.

Example 7 includes the subject matter of any of Examples 1-6, further comprising performing inter-process communication between the host processor and the ISH to coordinate the execution of the location application and the DMA transfers.

Example 8 includes the subject matter of any of Examples 1-7, wherein the location application is at least one of a navigation application and a mapping application.

Example 9 is an integrated sensor hub (ISH) comprising: an ISH memory to store a plurality of segments including a portion of a location database, the location database accessible by the ISH and a host processor in connection with the execution of a location application, wherein each segment is associated with a location area; an ISH processor to transfer one of the plurality of segments between the ISH memory and a host memory, wherein the transfer is a direct memory access (DMA) transfer; and the ISH processor further to execute a portion of the location application based on the plurality of segments stored in the ISH memory.

Example 10 includes the subject matter of Example 9, wherein each of the segments of the location database is associated with a location area defined by a range of latitude values and a range of longitude values.

Example 11 includes the subject matter of Examples 9 or 10, further comprising a Light Detection and Ranging (LIDAR) sensor to provide data for use associated with the execution the location application.

Example 12 includes the subject matter of any of Examples 9-11, further comprising an odometer sensor to provide data for use associated with the execution of the location application.

Example 13 includes the subject matter of any of Examples 9-12, further comprising a Simultaneous Localization and Mapping (SLAM) circuit associated with the execution of the location application.

Example 14 includes the subject matter of any of Examples 9-13, wherein the ISH processor initiates the DMA transfer in response to determining that a current location is at a location boundary associated with the segments stored in the ISH memory.

Example 15 includes the subject matter of any of Examples 9-14, wherein the ISH processor is further to perform inter-process communication with the host processor to coordinate the execution of the location application and the DMA transfers.

Example 16 includes the subject matter of arty of Examples 9-15, wherein the host memory comprises double data rate (DDR) memory.

Example 17 is at least one non-transitory computer readable storage medium having instructions encoded thereon that, when executed by one of more processors, result in the following operations for memory sharing. The operations comprise: allocating a shared region of a first memory, the shared region to be accessed by a host processor and by an integrated sensor hub (ISH), in connection with the execution of a location application; storing a location database in the shared region, wherein the location database is divided into a plurality of segments, each segment associated with a location area; transferring one of the plurality of segments between the shared region and a second memory associated with the ISH, wherein the transferring is a direct memory access (DMA) transfer; and executing a portion of the location application on the ISH based on data stored in the second memory.

Example 18 includes the subject matter of Example 17, wherein the allocating of the shared region and the storing of the location database are performed by the host processor and the transferring of one of the segments and the executing of the portion of the location application are performed by a processor associated with the ISH.

Example 19 includes the subject matter of Examples 17 or 18, wherein each of the segments of the location database is associated with a location area defined by a range of latitude values and a range of longitude values.

Example 20 includes the subject matter of any of Examples 17-19, the operations further comprising receiving, by the ISH, data from at least one of a Light Detection and Ranging (LIDAR) sensor and an odometer sensor, the data used for the execution of the location application.

Example 21 includes the subject matter of an of Examples 17-20, wherein the execution of the location application further comprises the operation of executing a Simultaneous Localization and Mapping (SLAM) algorithm.

Example 22 includes the subject matter of any of Examples 17-21, the operations further comprising managing the DMA transfer, by the ISH, in response to determining that a current location is at a location boundary associated with the segments stored in the second memory.

Example 23 includes the subject matter of any of Examples 17-22, the operations further comprising performing inter-process communication between the host processor and the ISH to coordinate the execution of the location application and the DMA transfers.

Example 24 includes the subject matter of any of Examples 17-23, wherein the location application is at least one of a navigation application and a mapping application.

Example 25 is at least one non-transitory computer readable storage medium having instructions encoded thereon that, when executed by one or more processors of an integrated sensor hub (ISH), result in the following operations for memory sharing. The operations comprise: storing, to a memory associated with the ISH, a plurality of segments including a portion of a location database, the location database accessible by the ISH and a host processor in connection with the execution of a location application, wherein each segment is associated with a location area; transferring one of the plurality of segments between the ISH memory and a host memory, wherein the transfer is a direct memory access (DMA) transfer; and executing a portion of the location application based on the plurality of segments stored in the ISH memory.

Example 26 is a system for memory sharing. The system comprises: means for allocating, by a host processor, a shared region of a first memory, the shared region to be accessed by the host processor and by an integrated sensor hub (ISH), in connection with the execution of a location application; means for storing, by the host processor, a location database in the shared region, wherein the location database is divided into a plurality of segments, each segment associated with a location area; means for transferring one of the plurality of segments between the shared region and a second memory associated with the ISH, wherein the transferring is a direct memory access (DMA) transfer; and means for executing a portion of the location application on the ISH based on data stored in the second memory.

Example 27 includes the subject matter of Example 26, wherein the transferring of one of the segments and the executing of the portion of the location application are performed by a second processor associated with the ISH.

Example 28 includes the subject matter of Examples 26 or 27, wherein each of the segments of the location database is associated with a location area defined by a range of latitude values and a range of longitude values.

Example 29 includes the subject matter of any of Examples 26-28, further comprising means for receiving, by the ISH, data from at least one of a Light Detection and Ragging (LIDAR) sensor and an odometer sensor, the data used for the execution of the location application.

Example 30 includes the subject matter of any of Examples 26-29, wherein the execution of the location application further comprises execution of a Simultaneous Localization and Mapping (SLAM) algorithm.

Example 31 includes the subject matter of any of Examples 26-30, wherein the DMA transfer is managed by the ISH in response to determining that a current location is at a location boundary associated with the segments stored in the second memory.

Example 32 includes the subject matter of any of Examples 26-31, further comprising means for performing inter-process communication between the host processor and the ISH to coordinate the execution of the location application and the DMA transfers.

Example 33 includes the subject matter of any of Examples 26-32, wherein the location application is at least one of a navigation application and a mapping application.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for memory sharing, the method comprising:
    allocating, by a host processor, a shared region of a first memory, the shared region to be accessed by the host processor and by an integrated sensor hub (ISH) that includes a second processor, in connection with the execution of a shared application on the host processor and the second processor, the shared application being a location, mapping, and/or navigation application;
    storing, by the host processor, a location database in the shared region, wherein the location database is divided into a plurality of segments, each segment associated with a geographic location defined by index values;
    transferring, by the second processor, one or more of the plurality of segments between the shared region and a second memory associated with the second processor, wherein the transferring comprises one or more direct memory access (DMA) transfers; and
    executing, by the second processor, a portion of the shared application based on the one or more of the plurality of segments stored in the second memory.

2. The method of claim 1, wherein the index values include a range of latitude values and a range of longitude values.

3. The method of claim 1, further comprising receiving, by the second processor, data from at least one of a Light Detection and Ranging (LIDAR) sensor and an odometer sensor, the received data being used for the execution of the shared application.

4. The method of claim 1, wherein the execution of the portion of the shared application further comprises execution of a Simultaneous Localization and Mapping (SLAM) algorithm.

5. The method of claim 1, further comprising a DMA transfer of one of the plurality of segments by the second processor between the shared region and the second memory in response to determining that a current location is at a location boundary associated with the one or more of the plurality of segments stored in the second memory.

6. The method of claim 1, further comprising performing inter-process communication between the host processor and the second processor to coordinate the execution of the shared application and the one or more DMA transfers.

7. The method of claim 1, wherein the shared application is at least one of a navigation application and a mapping application.

8. An integrated sensor hub (ISH) comprising:
an ISH processor;
an ISH memory to store a portion of a location database, the location database comprising a plurality of segments and being accessible by the ISH processor and a host processor in connection with the execution of a shared application on the ISH processor and the host processor, wherein each segment is associated with a geographic location defined by index values, and wherein the shared application is a location, mapping, and/or navigation application;
the ISH processor being to transfer one or more of the plurality of segments between the ISH memory and a host memory, wherein the transfer comprises one or more direct memory access (DMA) transfers, and wherein the host memory is to store the location database; and
the ISH processor being further to execute a portion of the shared application based on the one or more of the plurality of segments stored in the ISH memory.

9. The ISH of claim 8, wherein the index values include a range of latitude values and a range of longitude values.

10. The ISH of claim 8, further comprising a Light Detection and Ranging (LIDAR) sensor to provide data for use associated with the execution of the shared application.

11. The ISH of claim 8, further comprising an odometer sensor to provide data for use associated with the execution of the shared application.

12. The ISH of claim 8, further comprising a Simultaneous Localization and Mapping (SLAM) circuit associated with the execution of the portion of the shared application.

13. The ISH of claim 8, wherein the ISH processor initiates a DMA transfer of one of the plurality of segments between the ISH memory and the host memory in response to determining that a current location is at a location boundary associated with the one or more of the plurality of segments stored in the ISH memory.

14. The ISH of claim 8, wherein the ISH processor is further to perform inter-process communication with the host processor to coordinate the execution of the shared application and the one or more DMA transfers.

15. The ISH of claim 8, wherein the host memory comprises double data rate (DDR) memory.

16. At least one non-transitory computer readable storage medium having instructions encoded thereon that, when executed by two or more processors including a host processor and a second processor, result in the following operations for memory sharing, the operations comprising:
allocating, by the host processor, a shared region of a first memory, the shared region to be accessed by the host processor and by an integrated sensor hub (ISH) that includes the second processor, in connection with the execution of a shared application on the host processor and the second processor, the shared application being a location, mapping, and/or navigation application;
storing, by the host processor, a location database in the shared region, wherein the location database is divided into a plurality of segments, each segment associated with a geographic location defined by index values;
transferring, by the second processor, one or more of the plurality of segments between the shared region and a second memory associated with the second processor, wherein the transferring comprises one or more direct memory access (DMA) transfers; and
executing, by the second processor, a portion of the shared application based on the one or more of the plurality of segments stored in the second memory.

17. The computer readable storage medium of claim 16, wherein the index values include a range of latitude values and a range of longitude values.

18. The computer readable storage medium of claim 16, the operations further comprising receiving, by the second processor, data from at least one of a Light Detection and Ranging (LIDAR) sensor and an odometer sensor, the received data being used for the execution of the shared application.

19. The computer readable storage medium of claim 16, wherein the execution of the portion of the shared application further comprises the operation of executing a Simultaneous Localization and Mapping (SLAM) algorithm.

20. The computer readable storage medium of claim 16, the operations further comprising a DMA transfer of one of the plurality of segments by the second processor between the shared region and the second memory in response to determining that a current location is at a location boundary associated with the one or more of the plurality of segments stored in the second memory.

21. The computer readable storage medium of claim 16, the operations further comprising performing inter-process communication between the host processor and the second processor to coordinate the execution of the shared application and the one or more DMA transfers.

22. The computer readable storage medium of claim 16, wherein the shared application is at least one of a navigation application and a mapping application.

23. At least one non-transitory computer readable storage medium having instructions encoded thereon that, when executed by one or more processors of an integrated sensor hub (ISH) including an ISH processor, result in the following operations for memory sharing, the operations comprising:
storing, to an ISH memory associated with the ISH, a portion of a location database, the location database comprising a plurality of segments and being accessible by the ISH processor and a host processor in connection with the execution of a shared application on the ISH processor and the host processor, wherein each segment is associated with a geographic location defined by index values, and wherein the shared application is a location, mapping, and/or navigation application;
transferring one or more of the plurality of segments between the ISH memory and a host memory, wherein the transfer comprises one or more direct memory access (DMA) transfers, and wherein the host memory is to store the location database; and
executing a portion of the shared application based on the one or more of the plurality of segments stored in the ISH memory.

24. The computer readable storage medium of claim 23, wherein the index values include a range of latitude values and a range of longitude values.

25. The computer readable storage medium of claim 23, the operations further comprising initiating a DMA transfer of one of the plurality of segments between the ISH memory and the host memory in response to determining that a current location is at a location boundary associated with the one or more of the plurality of segments stored in the ISH memory.

\* \* \* \* \*